No. 86,705.  
PATENTED FEB. 9, 1869.
G. T. SNOWDEN & I. V. LYNN.
STEAM WATER ELEVATOR.
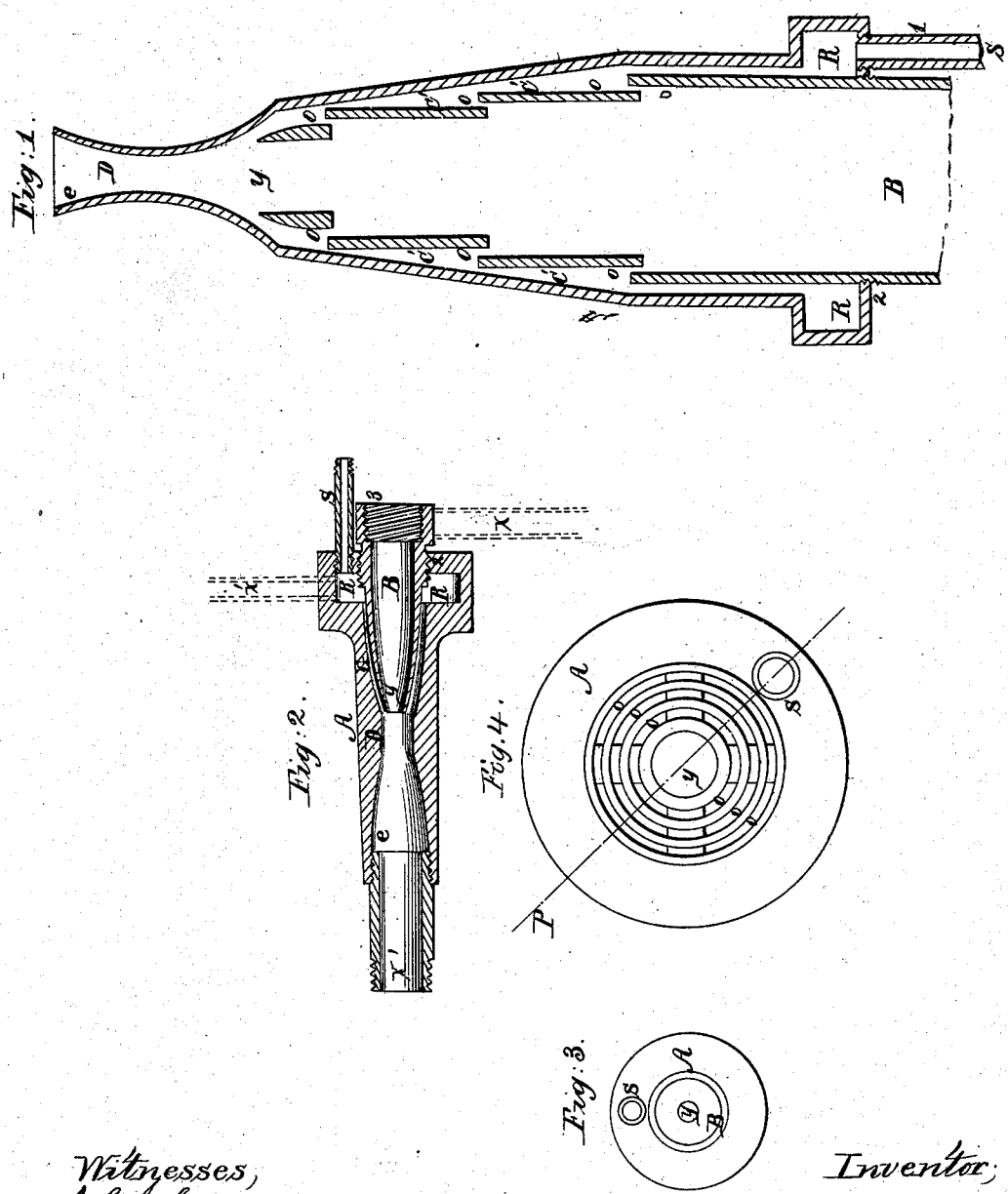
Witnesses,
A. C. Johnston
W. Johnston
Inventor;
George T Snowden
Isaac V Lynn

United States Patent Office.

GEORGE T. SNOWDEN AND ISAAC V. LYNN, OF PITTSBURG, ASSIGNORS TO THEMSELVES AND THOMAS SNOWDEN, OF BROWNSVILLE, PENNSYLVANIA.

Letters Patent No. 86,705, dated February 9, 1869.

IMPROVEMENT IN STEAM WATER-ELEVATORS.

The Schedule referred to in these Letters Patent and making part of the same.

*To all whom it may concern:*

Be it known that we, GEORGE T. SNOWDEN and ISAAC V. LYNN, of Pittsburg, in the county of Allegheny, and State of Pennsylvania, have invented a new and useful Improvement in Apparatus for Raising Water, &c.; and we do hereby declare that the following is a full, clear, and exact description thereof, reference being had to the accompanying drawings, and to the letters of reference marked thereon.

The nature of our invention consists in the combination of pipes A, B, and S, constructed and arranged with relation to each other, in manner substantially as hereinafter described.

To enable others skilled in the art to make and use our invention, we will proceed to describe its construction and operation.

In the accompanying drawings, which form part of our specification—

Figure 1 is a longitudinal section of a modification of our improvement in apparatus for raising water.

Figure 2 is a longitudinal section of our invention.

Figure 3 is an end view of the devices represented in fig. 2.

Figure 4 is an end view of the apparatus represented in fig. 1.

In the drawings—

A is the main pipe, or case, of the apparatus.

The pipe A is provided with a steam-chamber, R, into which leads a steam-pipe, S.

The bore of the pipe A, after passing the steam-chamber R, is in the form of an "hour-glass," that is to say, it is contracted at D, and expanded at $e$ and C.

The expanded part C has inserted in it a coniformed pipe, B, the outlet of which is at $y$.

The pipe B is screwed into the pipe A at the point marked 2.

The pipe B may be made in the form represented in fig. 1; that is to say, it may have a series of offsets, as indicated at C′, and a series of openings, $o$.

The steam-pipe leading to chamber R, and the pipe leading to the water, may be arranged as indicated by the dotted lines $x$.

The construction of our improvement in apparatus for raising water, being clearly shown in the accompanying drawings, we will therefore proceed to describe its operation, which is as follows:

The pipe $x'$, for carrying off the water, is secured to the end, $e$, of the pipe A, as indicated at 1, and the pipe leading to the water is attached to pipe B at 3.

The steam enters the chamber R through pipe S. From the chamber R it passes, in a thin annular sheet, around the pipe B, and forces through the contracted part D into the expanded part $e$, and thus, by the action of the steam, the water passes into and from the pipe B, and forces it out through pipe $x'$, to the place desired.

Having thus described the nature, construction, and operation of our improvement,

What we claim as of our invention, is—

The arrangement of parts A, B, C, R, and S, with reference to the conducting-pipe $x'$, substantially as herein described.

GEORGE T. SNOWDEN.
ISAAC V. LYNN.

Witnesses:
  A. C. JOHNSTON,
  JAMES J. JOHNSTON.